United States Patent [19]

Portolese

[11] Patent Number: 5,118,075
[45] Date of Patent: Jun. 2, 1992

[54] SEAL ARRANGEMENT FOR A METERING VALVE

[75] Inventor: Larry A. Portolese, Granger, Ind.
[73] Assignee: Allied-Signal Inc., Morristown, N.J.
[21] Appl. No.: 654,141
[22] Filed: Feb. 12, 1991
[51] Int. Cl.⁵ ............................................. F16K 1/42
[52] U.S. Cl. .................................... 251/120; 251/332; 251/363
[58] Field of Search .............. 251/332, 118, 120, 363

[56] References Cited

U.S. PATENT DOCUMENTS

| | | | |
|---|---|---|---|
| 2,464,400 | 3/1949 | Hooper | 251/332 X |
| 3,051,196 | 8/1962 | Miller | 251/332 X |
| 3,549,121 | 12/1970 | Mercier | 251/332 X |

*Primary Examiner*—Arnold Rosenthal
*Attorney, Agent, or Firm*—Leo H. McCormick, Jr.; Larry J. Palguta; Robert A. Walsh

[57] ABSTRACT

A seal arrangement for a metering valve wherein a cylindrical member has a groove located on a face adjacent a seat which surrounds an opening connected to an inlet port. An elastomeric member has a base which is located in the groove with a projection that extends past the face on the cylindrical member. A ring is resiliently held against the elastomeric member by a sleeve to form a first static seal between the cylindrical member, retaining ring and sleeve. A piston located in the sleeve has a flange with first and second ribs thereon separated by a recess. An input member positions the piston such that the first rib engages the projection and compresses the elastomeric member before the second rib engages the seat to form a static seal between the piston and cylindrical member to assure that fluid flow between an inlet port and an exit port terminates when the piston is in a closure position. The recess on the piston provides a space for the elastomeric material to flow without damage to the projection when the first rib engages the ring and the second rib engages the seat.

8 Claims, 1 Drawing Sheet

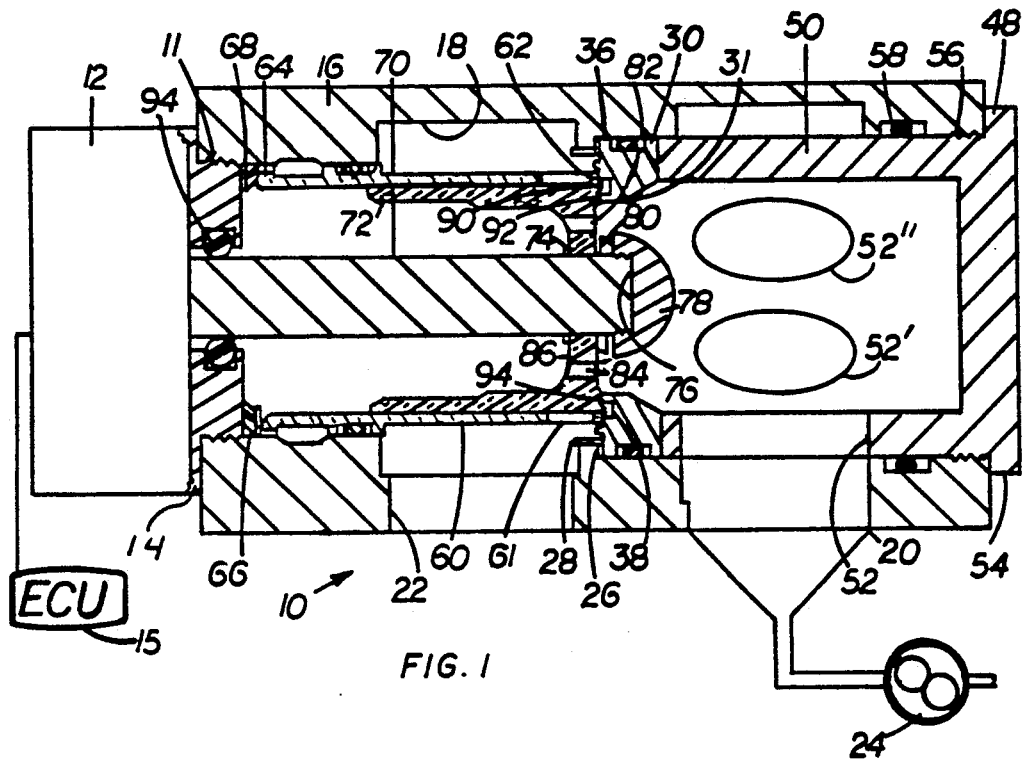
FIG. 1
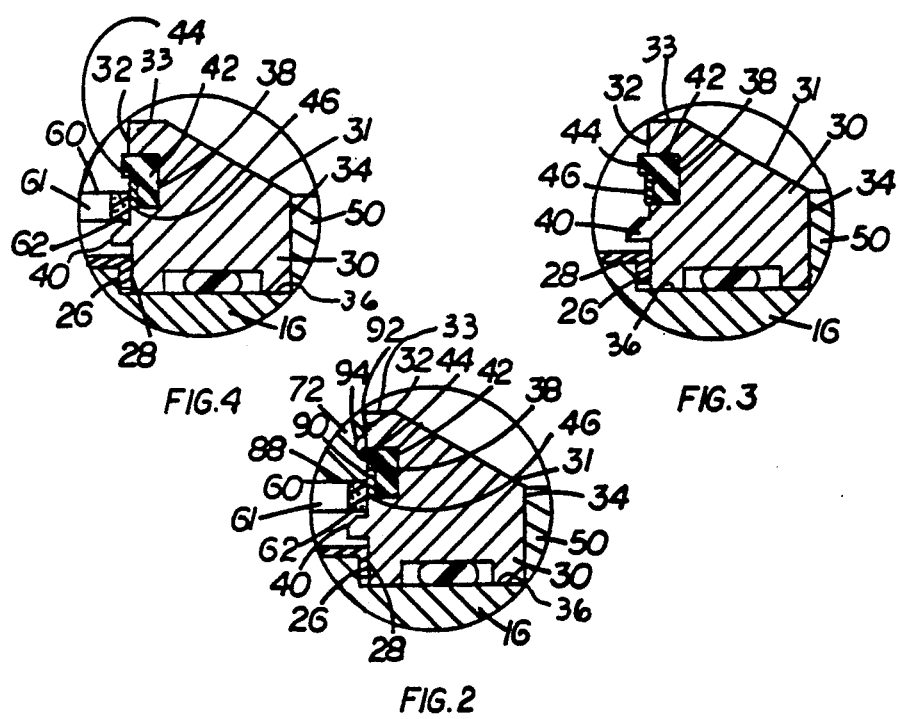
FIG. 4
FIG. 3
FIG. 2

SEAL ARRANGEMENT FOR A METERING VALVE

This invention related to a seal arrangement for metering valve. The seal arrangement has a cylindrical member with a groove for locating an elastomeric member which has a projection that extends above a face on the cylindrical member. A retaining ring is resiliently urged against the elastomeric member by a ceramic sleeve which has a plurality of openings connected to an outlet port. A ceramic piston has a flange with first and second ribs separated by a recess. An actuator moves the piston to a closure position where the first rib engages the projection while a second rib engages the seat to prevent flow of fluid between an inlet port and the outlet port. The recess allows the elastomeric material to flow without damage when the piston is in the closure position.

In fuel systems for use in supplying a turbine engine of an aircraft with fuel, it is important that the fuel supply is terminated when the turbine is inoperative or shut down. U.S. Pat. No. 4,876,857 discloses a shut off/pressure regulating valve for a turbine engine wherein a sealing arrangement allows for substantially friction free operation and terminates the flow of fuel when the turbine is in a shut off condition.

In an effort to simplify a fuel control system it was decided to incorporate the shut off valve in the metering valve. Unfortunately, after incorporating the shut off valve in the metering valve it was observed that an elastomeric seal could be damaged by repeated engagement of an operational piston.

The present invention provides a seal arrangement for a metering valve with an integral shut off wherein the possibility of damage to an elastomeric member has been reduced and essentially eliminated. In this seal arrangement, the metering valve housing has a bore with an inlet port connected to a source of fluid and an outlet port connected to a turbine. A cylindrical member is positioned against a shoulder in the bore by an end cap. The cylindrical member has a face with a first groove located adjacent adjacent a seat. An elastomeric member having a base with projection extending therefrom is located in the groove adjacent the seat. A projection on the elastomeric member extends past the face. A retaining ring is resiliently urged against the base of the elastomeric member by the end of a sleeve. A plurality of openings in the sleeve adjacent the end define a flow path between the seat and the outlet port. A piston located in said sleeve and connected to an actuation member has a flange with first and second ribs thereon separated by a recess. When the actuation member moves the piston toward a closure position, the first rib engages the projection to compress the elastomeric material prior to the second rib engaging the seat and the first rib engaging the ring to terminate fluid communication between the inlet port and outlet port. In the closure position, the elastomeric member flows into the recess in the flange of the piston to create a static seal between said piston and cylindrical member and thereby assure that fluid communication is completely terminated.

It is an object of this invention to provide a metering valve having an integral shut off valve with a seal arrangement wherein an elastomeric member is protected from damage caused by repeated engagement with an operational piston.

It is a further object of this invention to provide a metering valve with a piston having first and second sealing surfaces which engage a seat and elastomeric member, respectively to prevent the communication of fluid between an inlet and outlet port when the metering valve is in a closure position.

An advantage of this invention occurs through the simplicity of the integration of a metering valve with an operational piston responsive to an input actuator to control the flow of fluid between an input port and an exit port through the sequential engagement of a resilient member and seat to completely terminate fluid communication from the inlet port to an outlet port.

These advantages and objectives should be apparent from reading this specification while viewing the drawings wherein:

FIG. 1 is a metering valve having an integral shut off valve with a seal arrangement made according to the principles of this invention;

FIG. 2 is a enlarged view of a portion of the seal arrangement of FIG. 1;

FIG. 3 is an enlarged view of a portion of the seal arrangement of FIG. 1 when initially positioned in the bore of the metering valve; and FIG. 4 is an enlarged view of a portion of the seal arrangement of FIG. 1 with the piston located in a position to allow fluid communication between the inlet port and the exit port in the metering valve.

The metering valve 10 shown in FIG. 1 is designed as part of a fuel system for a turbine engine for use in an aircraft. The metering valve 10 has an actuation solenoid 12 which is controlled by an input signal from an electronic control unit 15 to meter fuel to the combustion chamber in the turbine.

The metering valve 10 has a housing 16 with a stepped bore 18 connected to a source of fuel 24 through an inlet port 20 and to the combustion chamber of the turbine through an outlet or exit port 22. A shoulder 26 in bore 18 separates the inlet port 20 and the outlet port 22. An annular shield 28 is located in bore 18 against shoulder 26 to guide or direct fluid into the outlet port 22 prior to the placement of a cylindrical body 30 in bore 18. The cylindrical body 30 forms the closure seat for the metering valve and an entrance cone for guiding or directing the flow of fluid from the inlet port 20 to the outlet port 22.

As best shown in FIGS. 2, 3 and 4, the cylindrical body 30 has a peripheral surface 36 which engages bore 18 and first and second faces 32 and 34 which are located in planes perpendicular to bore 18. Face 32 has a groove 38 and a rib or ledge 40 thereon.

An elastomeric material 42 has a base that is located in groove 38 and a projection 44 that extends past face 32 on cylindrical member 30. A retainer ring 46 made of a hard plastic material such as Teflon, initially has a portion that is located in the groove 38 and a portion that extends past face 32 as shown in FIG. 3. An end cap 48 has a cylindrical body 50 that extends into bore 18 and engages face 34 on cylindrical body 30 to hold annular shield 28 against shoulder 26. Cylindrical body 50 has a series of openings or slots 52, 52' . . . 52" through which fluid is communicated from inlet port 20 to the cone surface 31 on the interior of cylindrical body 30. Head 54 on end cap 48 is attached to housing 14 by the threads 56 and a seal 58 located in a groove in housing 16 assures that fluid from inlet port 20 is retained in bore 18.

A ceramic sleeve 60 located in bore 18 has a first end 62 that extends into bore 18 and sets on ledge or rib 40 on face 32 of cylindrical member 30 and a second end 64. A resilient member 66 in the form of a wave washer is located in bore 18 adjacent to the second end 64 of sleeve 60. A snap ring 68 connected to housing 16 holds sleeve 60 in bore 18 while resilient member 66 provides sufficient force such that the first end 62 urges retainer ring 46 into groove 46 as shown in FIG. 4 and forms a static seal between ring 46, end 62 and the elastomeric member 42. Sleeve 60 has a plurality of openings 61 (only one is shown) that connect bore 18 to outlet or exit port 22.

A shaft 70 that extends from actuation solenoid 12 has an end 76 located in bore 18. A nut 78 attached to end 76 acts on resilient member or wave washer 80 to position hub 86 on piston 72 against stop ring 74 on shaft 70.

Piston 72 which is also made from a ceramic material has a cylindrical body 88 which is located in the ceramic sleeve 60. Cylindrical body 88 has a flange with a first rib 90 connected to or separated from a second rib 92 by an annular recess or groove 94, as more clearly shown in FIG. 2. Hub 86 has a plurality of openings 82 and 84 which allows fluid communication between the inlet port 20 and the interior of sleeve 60 to provide for a balance force across piston 72. Seal 94 retained in housing 14 of the actuation solenoid 12 surrounds shaft 70 to retain fluid or fuel presented to bore 18 on housing 16 after housing 14 is connected to housing 16 by threaded connection 11.

The metering valve 10 shown in FIG. 1 is in the shut down condition with rib 92 on the flange of piston 72 seated on face 32 of cylindrical body 30 while rib 90 on the flange compresses projection 44 on elastomeric member 42 and ring 46 to statically seal bore 18 from the outlet port 22.

When actuator solenoid 12 receives an input signal from ecu 15, shaft 70 provides an actuation force which moves piston 72 to allow fluid or fuel to flow from the inlet port 20 to the outlet port 22. The input force from shaft 70 is communicated through wave washer or resilient member 80 to provide a smooth force which moves ribs 90 and 92 on piston 72 away from face 32 on cylindrical member 30 to allow fluid or fuel to flow from inlet port 20 to outlet port 22 by way of openings 52, 52' ... 52$^n$ in end cap 48, annular opening 33 in cylindrical body 30, past seat on face 32 and through openings 61 in sleeve 60 as shown in FIG. 4. Spherical surface on nut 78 and guide 28 aids in directing the flow of fuel through openings 31 without the creation of turbulence. The pulling or cavitation force of the fuel or fluid as it flows through opening 33 which attempts to displace the elastomeric member 42 from groove 38 is overcome through the constant resilient engagement of retaining ring 46 by end 62 of sleeve 60.

When ecu 15 supplies actuation solenoid 12 with a termination signal, a closure spring provides a force which moves shaft 70 and piston 72 toward seat or face 32 on cylindrical member 30 in bore 18. As piston 72 approaches face 32, rib 90 on the flange moves past openings 31 in sleeve 60 to initiate termination of fuel flow from inlet port 20 to the outlet port 22 through bore 18. Thereafter, rib 90 contacts projection 44 on the elastomeric member 42 to compress the elastomeric member 42 into groove 38 prior to engagement with ring 46. Thereafter, rib 92 is seated on face 32 to form a static seal that completely terminates communication of fuel from bore 18 to outlet port 22 through opening 33.

During the closure, when a sufficient force has been applied to elastomeric member 42 through rib 90, a portion of the elastomeric member 42 flows into recess 94 to prevent damage to the elastomeric member 42 while at the same time forming the static seal which prevents fuel from flowing past the seat on face 32.

I claim:

1. A seal arrangement for a metering valve having housing a bore therein and a piston moved in the bore in response to an input force to control the flow of fluid between an inlet port to an outlet port in the housing, the improvement comprising:

a cylindrical member located in said bore and having a first face with a first groove therein adjacent a seat;

an elastomeric member having a base with projection extending therefrom, said base being located in said first groove while said projection extends past said seat on the cylindrical member;

a ring having a first portion of which is initially located in said groove adjacent said base of the elastomeric member while a second portion extends past said face on the cylindrical member;

a sleeve located in said bore having a first end and a second end, said sleeve having a plurality of openings adjacent said first end, said first end engaging said ring;

a resilient member located in said bore and engaging said second end of said sleeve for urging said first end into engagement with said face, said first end moving said second portion of said ring into said groove to create a static seal between said ring, first end and base of said elastomeric member;

a piston located in said sleeve and having a flange with a rib thereon, said rib having an annular groove, said annular groove being offset from said first groove in said cylindrical member; and actuator means for moving said piston in said bore to allow fluid to flow from the inlet port through said cylindrical member past said seat and plurality of openings in the sleeve to the outlet port, said actuator means moving said piston into engagement with said seat in a closure position to terminate flow of fluid from the inlet port to the outlet port, said rib on said piston initially engaging and compressing said projection on the elastomeric material as the piston moves toward the closure position, said elastomeric member flowing into said annular groove on said flange to create a static seal between said piston and cylindrical member in the closure position.

2. The seal arrangement as recited in claim 1 further including:

an annular shield located between a shoulder in the housing and said cylindrical member, said shield directing the flow of fluid between said plurality of openings and said outlet port to reduce the creation of turbulence in the fluid.

3. The seal arrangement as recited in claim 2 wherein said ring retains said elastomeric in said groove during flow of fluid between said inlet and outlet ports.

4. The seal arrangement as recited in claim 3 wherein said plurality of openings in said sleeve are aligned with the annular shield to aid in the development of smooth flow of fluid past said elastomeric member.

5. The seal arrangement as recited in claim 4 further including:

an end cap having a second cylindrical body that extends into said bore and engages said first cylindrical body to position said annular shield against said shoulder, said second cylindrical body having a series of openings through which said fluid is communicated from said inlet port to the interior of said first cylindrical member.

6. The seal arrangement as recited in claim 5 wherein said actuator means includes:

a shaft having a stop that engages said piston;

a nut arrangement attached to said shaft; and a spring located between said nut and piston for providing a smooth transmission of the input force into said piston.

7. The seal arrangement as recited in claim 6 wherein said piston has a plurality of passages whereby the fluid is communicated to balance the fluid pressure across the piston.

8. The seal arrangement as recited in claim 7 wherein said nut on said shaft has a spherical surface to aid in directing said fluid past the seat without the creation of turbulence.

* * * * *